United States Patent [19]

Howe

[11] 4,007,115
[45] Feb. 8, 1977

[54] PROCESS FOR TREATING SPENT MONENSIC ACID ANTIBIOTIC FERMENTATION BROTH CONTAINING RELATIVELY HIGH CONCENTRATIONS OF FATTY AND PROTEINACEOUS RESIDUES

[75] Inventor: Robert H. L. Howe, West Lafayette, Ind.

[73] Assignee: Eli Lilly and Company, Indianapolis, Ind.

[22] Filed: Aug. 15, 1975

[21] Appl. No.: 605,085

Related U.S. Application Data

[63] Continuation-in-part of Ser. No. 460,642, April 12, 1974, abandoned.

[52] U.S. Cl. .................................. 210/27; 210/28; 210/53
[51] Int. Cl.$^2$ ........................................ B01D 15/04
[58] Field of Search ............... 210/23, 27, 28, 53, 210/283, 284, 290, 500, 24, 37 R, 38 R; 260/112 R

[56] References Cited

UNITED STATES PATENTS

| | | | |
|---|---|---|---|
| 2,072,848 | 3/1937 | Brown | 210/284 |
| 2,708,630 | 5/1955 | Davis | 210/53 |
| 3,687,928 | 8/1972 | Brouwer et al. | 260/112 R |
| 3,697,419 | 10/1972 | Grant | 210/27 |

*Primary Examiner*—Thomas G. Wyse
*Assistant Examiner*—Ivars Cintins
*Attorney, Agent, or Firm*—Ralph W. Ernsberger; Everet F. Smith

[57] ABSTRACT

A process is provided for treating spent antibiotic fermentation broth containing concentrations of up to about 12 percent fats and up to about 9.5 percent proteins which comprises acidifying such spent broth to coagulate the fats, impinging the coagulated fat on a coalescing strainer, basifying the effluent therefrom to coagulate the proteinaceous material, filtering the basified spent broth to remove the proteinaceous material, and passing the filtrate serially through anionic and cationic exchange resins, wherein the biological oxygen demand of the effluent therefrom is reduced to a level of less than 0.04 g. oxygen per liter.

7 Claims, 1 Drawing Figure

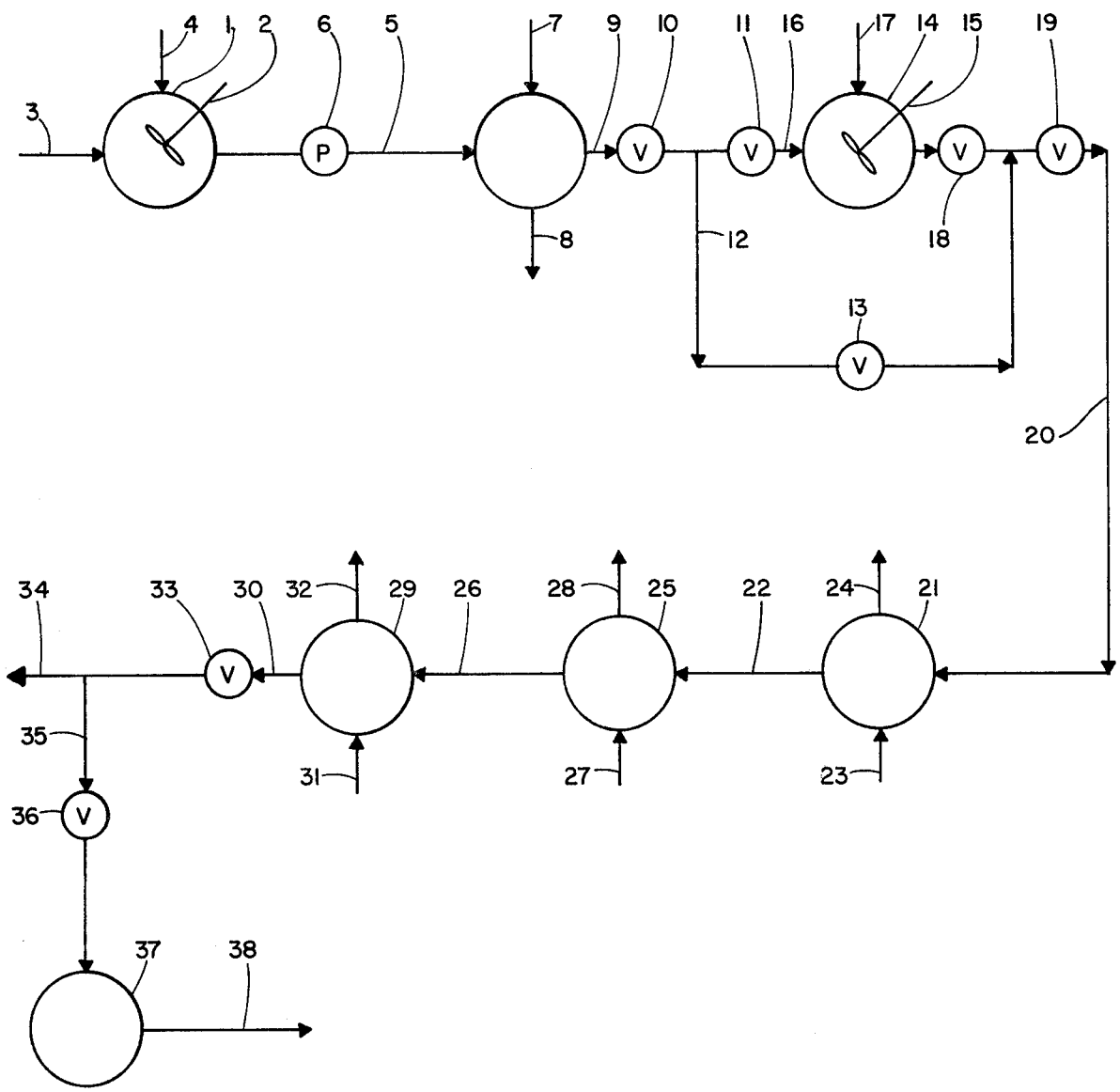

PROCESS FOR TREATING SPENT MONENSIC ACID ANTIBIOTIC FERMENTATION BROTH CONTAINING RELATIVELY HIGH CONCENTRATIONS OF FATTY AND PROTEINACEOUS RESIDUES

CROSS-REFERENCE

This is a continuation-in-part of application Ser. No. 460,642 filed Apr. 12, 1974, now abandoned.

BACKGROUND OF THE INVENTION

1. Field of the Invention

This invention relates to a bio-chemical engineering process. More particularly, this invention relates to a process by which spent antibiotic fermentation broth containing relatively high concentrations of fatty and proteinaceous material can be treated to reduce the biological oxygen demand of the effluent therefrom to a level that meets the requirements of the Environmental Protection Agency for waste water being discharged into the environment.

2. Description of the Prior Art

Over the past centuries processes involving fermentations utilizing microorganisms have been used all over the world. Perhaps the earliest example of this, which has come down to us from antiquity, has been the fermentation of carbohydrates to produce alcoholic beverages. Little more need be said about that.

In the past three or four decades another very important application of the fermentation process has been the production of useful antibiotics. Beginning with the development of the submerged culture technology for the preparation of penicillin, there has been a great proliferation of antibiotics useful not only for curing a wide variety of infectious ills of mankind, but also in the field of animal husbandry and animal nutrition. As the development of these many antibiotics has gone forward, large numbers of diverse organisms have been found which, when grown in a suitable media, provide useful products. And, as this development has proceeded, a wide range of problems have been encountered in the disposal of the waste from such operations.

In the culture of the microorganisms for the production of antibiotics all sorts of nutritive agents have been identified as useful in promoting the growth of such organisms. Moreover, techniques have been established which often result in an abundance of residual materials in the spent broth, most of which are organic in nature and must be disposed of by means other than simply discharging the waste into the sewer or directly to the environment.

Many of the useful antibiotic materials available today have been produced by growing the microorganism in media rich in both fats and proteins. The presence of these nutrients in the fermentation broth in which the antibiotic is produced has resulted in spent broth having relatively high concentrations of fats and/or proteins and their residues. Biological degradation of these residues in the spent broth is slow and costly.

One spent antibiotic fermentation broth which is illustrative of the broth wherein the residual fats and proteins and their fragments are considered to be relatively high is that of the antibiotic monensic acid from the fermentation of the microorganism *Streptomyces cinnamonensis*. In this fermentation procedure, a wide variety of materials are used, and produced as metabolites in the culture, which can be identified as fats. Furthermore, there are residual proteins and fragments of proteinaceous material carried over in the broth in which the monensic acid is produced and from which such acid is recovered as a useful antibiotic. Monensic acid is being widely utilized throughout the world as an exceptionally active coccidiostat. Frequently spent fermentation broth from which monensic acid is isolated has been found to contain fats to the extent of as much as 11 percent before, and four percent after primary recovery. The residual proteinaceous content runs in the neighborhood of one percent.

For the purpose of this invention fats may be described as any monocarboxylic acid of more than 2 carbon atoms in length whether as a free acid or in the form of a mono-, di-, or tri-, glyceride. Proteinaceous material is generally recognized as being those organic compounds which are comprised of a number of amino acids assembled by nature in a predetermined orientation.

The conventional and classic means for disposing of spent fermentation broth from which essentially all of the antibiotic has been isolated has followed the route of a pH-adjustment to from about 8.0 to 9.0, slurrying with such pH-adjusted spent broth a quantity of either aerobic or anaerobic activated sludge, vigorously agitating such slurry for an extended period of time, clarifying such activated sludge containing spent broth by allowing the slurry to settle for 2 to 4 hours or more and then decanting the supernatant from the clarification operation and again artificially aerating such supernatant to further reduce the biological oxygen demand to a suitable level before discharging the waste into the environment.

The employment of such a process requires large size equipment, a long period of time, a substantial energy input in the artificial aeration of the supernatant and a reasonably high cost due to the materials handling and power requirements.

Accordingly, it is an object of the instant invention to provide a process which will be simple, uncomplicated, low in cost, and workable with a minimum of equipment and energy input to reduce the concentrations of the residual fats and proteinaceous material in a spent antibiotic fermentation broth to a level wherein the biological oxygen demand of the effluent from such process meets the requirements of the Environmental Protection Agency of no more than a biological oxygen demand of 0.04 g. oxygen per liter.

SUMMARY

It has now been discovered that a process which combines in sequence the gross removal of the fats and proteinaceous material from spent fermentation broth containing relatively high concentrations of such materials by pH-adjustment, coagulation and filtration followed by a serial contact of such treated broth with an anion and cation exchange resin can be utilized to reduce the biological oxygen demand of the effluent from such process to a level below the 0.04 g. oxygen per liter standard. Such process comprises the steps of acidifying the spent broth to coagulate the fats, contacting such broth with a coalescing strainer, basifying the essentially fat-free broth, filtering such broth and passing the filtered broth serially through anion and cation exchange columns.

DESCRIPTION OF THE PREFERRED EMBODIMENTS

The useful process for treating spent antibiotic fermentation broth containing concentrations of up to about 12 percent fats and residues thereof and up to about 9.5 percent protein and residues thereof of the instant invention is comprised of the following steps:
 a. Acidifying the spent fermentation broth to a pH of from about 3.0 to about 5.0;
 b. passing the acidified broth from step a) through a coalescing strainer wherein coalesced fat particles resulting from said acidification are impinged on a plate or screen disposed in such strainer and are removed from said broth;
 c. basifying the broth discharged from the coalescing strainer of step b) to a pH of from about 8.0 to 9.0;
 d. passing the basified broth of step c) through a filtering means to remove the coalesced protein materials formed in step c)
 e. passing the filtrate from the filtering means of step d) through an anion exchange column to remove the residual fatty materials from such filtrate; and
 f. passing the effluent from the anion exchange column of step e) through a cation exchange column to remove the residual proteinaceous material from such effluent.

The novel process described herein provides a method for treating spent broth from antibiotic fermentations to remove these unwanted fats and proteinaceous materials so that the residual spent broth can be released into the environment with a biological oxygen demand of less than 0.04 g. oxygen per liter of spent broth. The figure mentioned above is the maximum allowable biological oxygen demand permitted by the Environmental Protection Agency in waste waters released to the environment under certain specific conditions.

Quite surprisingly it was discovered that concentrations of fats and residues thereof of up to about 12 percent can be effectively removed from spent antibiotic fermentation broth by the useful process of this invention. Moreover, such removal can take place in the presence, in such broth, of concentrations of up to about 9.5 percent of proteins and fragments thereof. Ordinarily, the concentrations of fatty materials in a spent antibiotic fermentation broth will average about 0.3 percent; rarely going over one percent. Consequently, concentrations of fatty materials as high as 3–10, 12 percent are considered to be relatively high in relation to the usual amounts present. The average proteinaceous materials present in such broth will run around one percent; only occasionally going as high as 1.5 or more. Which means that concentrations of such materials of up to 1.5–7, 9.5 percent in the spent broth are considered to be relatively high in comparison with the average amounts generally found.

Furthermore, almost without exception, proteins are utilized in the growing media wherein microorganisms produce useful antibiotics in the fermentation process. These proteins are all nitrogen bearing materials. Proteins are made up of amino acids in many diverse arrangements. Those proteins which are not completely utilized in the fermentation process provide not only unconsumed intact molecules, but many molecular fragments, which in effect, are comprised principally of amino acids. Once again these materials comprise a group of substances which, when present in water, require large quantities of oxygen and an exceptionally long time for their biological degradation. And when the concentration of these proteinaceous residues becomes relatively high in the range of 1.5–7, 9.5 percent, extreme difficulty is encountered in removing such residues from the spent broth. The instant process can be used to efficiently and economically reduce such concentrations to near zero so that the spent broth can be discharged directly to the environment.

The acidifying of the spent broth from the antibiotics fermentation process can be satisfactorily achieved by utilizing any one of the mineral acids such as hydrochloric, nitric, phosphoric, sulfuric, and the like, preferably sulfuric. Inasmuch as by previous definition the monocarboxylic acids and the glycerides of which they are frequently a part have been categorized as fats which are unwanted and are to be removed from the spent broth, organic acids are not recommended for the acidification of such spent broth because of their oxygen demand and solvent characteristics. The acidification of the spent broth should proceed with vigorous agitation until the pH reaches a point from about 3.0 to about 5.0. Preferably, the pH should be established at the lowest level consistent with the economics of the total process and the concentration of the fats contained in such spent broth. The lower the pH, the higher the effectiveness of the coalescing of the fats becomes. As is well known by those skilled in the art, the addition of sulfuric acid to water presents the problem of the dissipation of the heat which is produced when concentrated sulfuric acid is diluted. For that reason it is recommended that the sulfuric acid is diluted, preferably to about 10 percent, before it is added to the spent broth to be treated. While this is not imperative nor even considered to be desirable beyond the need for maintaining safe operations, it is a factor to be considered in relation to the style and safety of the process and equipment being utilized for the acidification.

Most antibiotics are produced by submerged culture procedures in which various nutrient materials are employed to promote the growth of the microorganism from which the antibiotic is obtained. In many cases, the growing media contains either or both large quantities of fats and proteins in addition to carbohydrates, minerals, etc. Moreover, not only are various fats added to the growing media to supply essential foodstuffs for the microorganism, many monocarboxylic acids such as propionic, butyric, etc. are produced from fats in the metabolic processes of the fermentations. Consequently, not all of these fats are consumed in the fermentation procedure and as much as 12 percent of some of the spent broths from antibiotic fermentation are one or more of the previously defined fatty materials. For example, in the fermentation of the highly useful antibiotic monensic acid, the total fatty content of the broth from which the antibiotic is isolated can run as high as 11 percent before primary recovery. The disposal of spent broth containing relatively high concentrations of fats and residues thereof presents a difficult problem because fats are not all readily biologically degradable and in biological treatment procedures heretofore employed, large quantities of oxygen and a long time were needed to assist in the destruction of such materials prior to the release of the water in which they were contained into the environment. Moreover, when such fats are not removed, they can be visible nuisances.

As the acidification of the spent broth proceeds, the vigorous agitation which is utilized to produce a homogenous blending should be continued until the pH is established at a steady level. No particular benefit is provided by continuing the agitation beyond this point.

The acidified spent broth is next passed through a coalescing strainer to remove the coalesced fatty materials from such broth. Coalescing strainers are available commercially in many different designs, but are essentially constructed of a vertical plate or screen disposed within a chamber. The plate or screen is positioned very close to the inlet to the strainer and at right angles to such inlet. Ordinarily, the inlet is mounted on a horizontal plane and the plate or screen is disposed vertically thereto. In operation the fluid stream entering the inlet is maintained on a straight course from a point sufficiently remote from the inlet to assure an essentially streamlined fluid flow when the fluid stream enters the inlet and contacts the vertical plate or screen disposed therebehind. A stream of spent broth containing the coalesced fatty material is introduced into the coalescing strainer at a velocity sufficient to impinge the coalesced fatty material on the vertical plate or screen and separate such material from the main stream of broth. The coalesced fatty material is removed by the impingement thereof on the plate or screen. An outlet at the top of the strainer provides for the discharge of the coalesced fats (light phase, i.e., lower density) which after impingement of the vertical plates or screen slowly move toward the top of the strainer. The heavy phase (higher density) fluid is collected at the bottom and is discharged by gravity. Those skilled in the art will recognize and understand the velocity which is required to effect the impingement of the fatty materials. Appropriate fluid stream velocities can generally be achieved by using a centrifugal pump operating at a relatively high RPM, such as 1750 or thereabout.

Gear pumps can also be utilized but such positive displacement apparatus as diaphragm and piston pumps are not recommended for this purpose.

The materials of construction of the coalescing strainer should be one of those which will resist the corrosive action of the low pH present in the acidified spent broth. Such materials as 316 or 317 stainless steel or acid resistant plastics are suitable for this purpose.

The effluent from the coalescing strainer is conducted to a means for basifying the substantially fat-free spent broth. The basification of the acidified spent broth can be carried out in a vessel of any reasonable configuration to which a stream of an alkalizing agent can be added. The alkalizing agent is commingled with the acidified broth until the pH is raised to from about 8.0 to about 9.0. The vessel in which such basification takes place is equipped with means for vigorously agitating the broth during the basification step. The agitation is continued until the pH reaches a steady level. In the course of the basification accompanied by vigorous agitation, the proteinaceous material present in the spent broth is coalesced. The addition of sodium aluminate or aluminum sulfate can improve coagulation in this stage. Alternatively, the mixture can be pumped to a protein coalescer where the emulsion is broken and the protein is separated from the water. The water is passed through a filter and the filtrate is directed to ion exchange means for the removal of the residual soluble proteinaceous material. For this a cation exchange column is used. However, an anion exchange column must be added if residual protein is in the amino acids state.

In the useful process of this invention it was found that a total concentration of soluble proteinaceous material up to about 9.5 percent in the spent broth could be effectively processed by basification to the specified pH range of 8.0 to 9.0. The 9.5 percent proteinaceous material is equivalent to about 1.5 percent total nitrogen when such nitrogen is computed on the basis of the amino acid content of the proteinaceous material. The spent broth from the monensic acid fermentation generally runs in the neighborhood of about one percent proteinaceous material—equivalent to about 0.18 percent total nitrogen.

The basification setup in this novel process can be carried out by employing one of the hydroxides of the alkali metal materials such as lithium, potassium, sodium and the like, preferably sodium, or alternatively, one of the alkaline earth hydroxides such as calcium or magnesium and the like. In any event, the hydroxide is diluted to a concentration of about 5 percent.

While the useful process of this invention embodies the treatment of an antibiotic fermentation broth wherein the concentration of both the fats and proteinaceous material are relatively high, there are occasions when only one of these materials will be present in an amount which requires the utilization of this method for the treating of the spent broth prior to its release into the environment. When the fat concentration is high but the proteinaceous material level is insignificant, there is no need to basify the acidic spent broth from the fat removing operation and consequently, the substantially fat-free spent broth can be delivered directly to the filtering operation. By the same token, where the fat concentration is insignificant but the spent broth is heavily laden with proteinaceous materials, the acidification step and the subsequent removal of coalesced fats in the coalescing strainer can be bypassed and the spent broth basified as discussed hereinbefore immediately before passing such treated broth to the coalescer followed by a filtering operaton.

The filtering operation to which the spent broth is delivered after the treatment for the removal of coalesced fats and the subsequent basification for the coagulation and coalescing of the proteinaceous material comprises a mechanical procedure for the removal of the macro-particles in such spent broth. This operation can be carried out by gravity flowing the spent broth through a bed of such filtering agents as finely divided attapulgite, bentonite, montmorillonite, kaolin, ground limestone, sand and the like. Or a conventional cartridge type filter can be used with the addition of pressure to push the filtrate through the filter medium. The filtration agent serves the useful purpose of taking out the macro-particles leaving behind in the effluent only micro- or submicro- particles and dissolved fats and proteinaceous materials for subsequent removal in the ion exchange columns. Also a filter employing a porous filter medium will serve the same objective. Those skilled in the art will recognize the many mechanical adaptations that can be utilized to accomplish the filtration operation. For example, a centrifuge can be employed for this purpose. When a centrifuge is operated so that a force of about 6,000 G. is exerted, a substantially complete removal of the macro-particles of coalesced proteinaceous material is achieved.

With the spent broth essentially free of both fats and proteinaceous material, such broth is passed successively through an anionic and then a cationic exchange column. Because there are small quantities of residual fats and protein, present in the spent broth, it is essential that such broth not be subjected to a mixed bed treatment because when it is, there is an exchange of the hydroxyl groups from the cationic resin which will tend to attract the fat and foul the operation. For that reason, it is imperative that the spent broth be passed through a simple separate anionic exchange column for the removal of the residual fats before being delivered to the separate cationic exchange column for the removal of the residual proteinaceous material.

In passing the spent broth over an anionic exchange resin, the carboxyl groups on the acids in the fats in such broth are bound to the basic functional group on the anionic exchange resin and the fat is removed from the stream of spent broth. Typically, appropriate exchange resins having quaternary ammonium functional groups are especially useful for this operation. Representative of such resins are those available from Rohm & Hass, Philadelphia, Pa., under such designations as IRA-400, IRA-900, IRA-904, IRA-938, and IRA-910, all of which are strongly basic. Equivalent resins available from other commercial sources are also operative in the useful process of this invention. Alternatively, hydrophobic adsorbents can be utilized with good success in removing the fats from the spent broth. Typical of such useful hydrophobic adsorbents are those available from Rohm & Haas under the designation of XAD-2 and XAD-4.

In addition to the removal of the fats by the anion exchange resins, those amino acid fragments which are of an acidic character will be bound to such resin and removed from the stream of spent broth.

Following the contact of the spent broth with the anion exchange resin the spent broth is conveyed to a cationic exchange column wherein the proteinaceous and other positively charged materials are tied up through the exchange of a hydrogen group. As with the anionic exchange resin which binds the fatty radicals, the cationic exchange column binds the proteinaceous material, and, in this manner clears the spent broth of essentially all of the proteinaceous material remaining therein following the filtration operation. Any cationic exchange resin having the capacity to exchange a hydrogen moiety will be suitable in this operation. Representative of such cationic exchange resins are those which are weakly acidic having a caboxylic functional group and those which are strongly acidic from a sulfonated functional group. Those resins designated IRC-50 and IRC-84 are in the class having a carboxylic functionality, and IR-120 and amberlite 200 are among the sulfonated class; all being available from Rohm & Hass, Philadelphia, Pa.

Frequently, it can be desirable to provide an additional anion exchange following the cation exchanger if there are appreciable free amino acids remaining in the waste water which need to be removed. This is particularly useful if the proteinaceous materials carry (−) electric charges.

The treated spent broth flowing from the cationic exchange column will have a biological oxygen demand below the 0.04 g. oxygen per liter specified by the Environmental Protection Agency as the maximum allowable in waste water discharged into the environment under certain specific conditions. To accomplish this it is, of course, necessary to operate the ionic exchange columns only so long as they have the capacity to make the interchange of the hydrogen and hydroxyl ions respectively and consequently bind the fats and proteinaceous material in the stream of spent broth passing therethrough. All of which means that the ion exchange columns must be regenerated from time to time by backwashing to remove the materials bound to the respective resins. And the same is true with the filtration means if a filter bed is employed. All three of these backwashing operations can be effectively performed by utilizing a fraction of the effluent spent broth from the cationic exchange column or the final anion exchange column, if one is employed.

The backwashing of the filtering agent employed in the filtration operation is accomplished by simply reversing the flow of the fluid passing through the bed and for this purpose, the treated spent broth can be effectively utilized. A volume of spent broth equal to about ten times the volume of the filtration agent is pumped in a reverse flow through such bed and in the course of such flow, the particles of coalesced fats and proteinaceous material are mechanically separated from the filtering agent and removed thereby regenerating the bed of filtering agent for additional use.

The regeneration of either the anion exchange column or the cation exchange column can be accomplished by utilizing the treated effluent spent broth from the last column for backwash. In order to regenerate the anion exchange column, the quantity of the treated spent broth equal in volume to about four to ten times the volume of the anion exchange bed is employed as a solvent for an alkalizing agent such as sodium hydroxide. Such sodium hydroxide is dissolved in the treated spent broth to provide about a 5 percent concentration of the caustic soda. The anion exchange column is then regenerated by passing the 5 percent sodium hydroxide solution through the resin bed in a reverse flow to the direction of the spent broth from which the residual fatty material is removed. Other soluble alkalizing agents which can be utilized other than sodium hydroxide include: potassium hydroxide, lithium hydroxide, ammonium hydroxide, and the like. Sodium hydroxide is preferred for the regeneration procedure because of its great solubility and ease of use. Any other less soluble hydroxide is suitable for the purpose of regeneration as clogging can result from its use. In any event, the backwashing or regeneration procedure prepared the anionic exchange column for the reception of additional fatty material which is subsequently removed in a similar manner.

The cation exchange column is regenerated in a manner similar to that employed for the anion exchange column except that instead of utilizing a 5 percent concentration of sodium hydroxide or other alkalizing agent, a 5 percent concentration of sulfuric acid or other mineral acid without an oxygen demand is employed. Other suitable mineral acids include hydrochloric, nitric, phosphoric and the like. The effluent spent broth from the cationic exchange column is emminently satisfactory for use as the diluent for the mineral acid. A volume of dilute acid equal to about four to ten times the volume of the cationic exchange resin bed generally suffices to accomplish the regeneration.

Other concentrations of the regenerating solution can be successfully utilized and the volume of such solutions can be adjusted to compensate for the change in the concentration of the regenerating agent. It is only necessary in each case that the quantity of available ions passed through the respective resin beds be sufficient to exchange with all the fat molecules, amino acids, proteinaceous and other positively charged material bound to the respective resins, and consequently, release these materials into the solution of regenerating agent in which they are removed from the column.

As is well known to those skilled in the art, it is unwise to attempt to utilize the full capacity of each of the two exchange columns for the removal of the fats and proteinaceous material from the spent broth. Ordinarily, it is to be expected that the efficiency of the ion exchange columns will be somewhere in the neighborhood of a maximum of 80 percent. Therefore, a 50 percent additional ion exchange column capacity is desirable. When the total fats and proteinaceous materials in the effluent spent broth from the filtration operation exceeds an amount which when reduced by 80 percent will not equal a biological oxygen demand of less than 0.04 g. oxygen per liter of effluent, it is necessary to provide a series of ion exchange columns in order that the biological oxygen demand can be reduced to such an amount. When the series of ion exchange columns is required, it is preferred that the series be one in which all of the anionic exchange takes place prior to the cationic exchange for reasons expressed hereinbefore. Otherwise, a secondary set of anion and cation exchange columns to be employed for handling the effluent from the first series of anion and cation exchange columns may ensure the achievement of producing an effluent of 0.04 grams per liter oxygen demand or less.

The description of the mechanical embodiments of the novel process of this invention is illustrated in the accompanying schematic drawing, and reference is made thereto. No attempt is made to provide more than a flow chart in this rendering and the numbers indicating the various operations describe a particular step and are not to be construed as representative of the configuration of the equipment utilized in the operation.

In the drawing the operation labeled 1 denotes a vessel into which the spent antibiotic fermentation broth, having a relatively high fat and/or protein content, is accumulated. Such vessel 1 can be of any convenient size and configuration. There is no need for either a pressure vessel, a jacketed vessel or even a vessel having both a closed bottom and top. Such vessel 1 is equipped with a means for agitating the spent broth. The agitator 2 can be a top entering turbine or a top, side or bottom entering propeller type agitator or any one of a number of additional means for agitation known to those skilled in the art.

The spent fermentation broth containing relatively high concentrations of fatty and/or proteinaceous residues is conveyed to vessel 1 through conduit 3. In the useful process of the instant invention the reduction of the relatively high concentration of fatty residues is the first order in the process. To accomplish such a reduction it is essential that the pH of the spent broth should be lowered to the range of 3.0 to 5.0 to aid in the coagulation of the fat and to render such coagulated material hydrophobic. The pH-adjusting material is introduced into vessel 1 through conduit 4. While many different pH-adjusting agents can be employed, as will be known to the art, sulfuric acid is preferred because of the economics accompanying its use. During the addition of the required amount of sulfuric acid to vessel 1 through conduit 4, the agitator 2 is operated to assure a homogenous blending.

From vessel 1, the pH-adjusted spent broth is moved by pump 6 through conduit 5 to a coalescing strainer 7. In the coalescing strainer 7 the coalesced fat particles are deposited on a collector set in a vertical orientation by directing a stream of the acidic spent broth against such plate to impinge the coalesced fatty materials thereon. The fat particles which are deposited on such a vertical collector slowly rise and are accumulated at the top of the strainer and removed from the operation through conduit 8. The acidic spent broth from which the coalesced fat particles have been mechanically separated is conveyed through conduit 9 in which is provided a valve 10 to either conduit 12 or conduit 16, depending upon the route that the acidic spent broth is to take through the remainder of the process. If there are relatively high concentrations of proteinaceous material present, the spent broth is conveyed through conduit 16 in which there is located valve 11 to a vessel 14 in which there is a means for agitation 15. If the acidic spent broth does not require treatment for the removal of such proteinaceous material, such broth is conveyed around vessel 14 through conduit 12. To accomplish this, valve 11 is closed and valve 13 in conduit 12 is opened.

In those cases where it is desirable to treat the acidic spent broth to remove the relatively high concentrations of proteinaceous material, the acidic spent broth is accumulated in vessel 14 wherein the pH is raised to the range of 8.0 to 9.0 to render the proteinaceous particles hydrophobic. This is accomplished by introducing an alkaline material such as sodium hydroxide into vessel 14 through conduit 17. Additional appropriate alkalizing agents are known to the art. Aluminum sulfate or sodium aluminumate may be added here to improve the coagulation. In vessel 14 the alkalinizing operation is accomplished by running the agitator 15 until a homogenous blend is achieved. Agitation means such as those described hereinbefore are appropriate for accomplishing this need.

Whether the spent fermentation broth is treated for the removal of the proteinaceous material or not, such spent broth is conveyed through conduit 20 to a filtering operation 21, valve 19 positioned in conduit 20 provides a means for regulating the flow.

In the filtration operation 21 the spent broth is passed through a bed of a filtering agent in a top to bottom direction. The filtering agent can be one of many inert materials such as diatomaceous earth, bentonite, attapulgite, montmorillonite, kaolin, pulverized limestone, sand and the like. The filtering operation removes the residual coalesced fatty materials and the macro proteinaceous materials rendered hydrophobic in the alkalinizing operation. From the filtering operation the spent broth from which the coalesced fats and proteins have been removed is conveyed through conduit 22 to an anion exchange column 25. It is imperative that the fats, which are not coalesced by the pH adjustment and removed in either the coalescing strainer or the filtration operation, be removed from the stream of spent broth before the proteinaceous materials are taken out of the stream. If this is not done, the residual fatty material can become emulsified in the spent broth whereupon it becomes extremely difficult to remove such fats by the means provided herein.

From the anion exchange column 25 the substantially fat-free spent broth is conveyed through conduit 26 to a cation exchange column 29. The cation exchange column 29 provides a means for removing proteinaceous residues from the stream of spent broth. From the cation exchange column the substantially fat and protein-free spent broth is conveyed through conduit 30, and valve 33, either a discharge line into the environment or to a storage vessel. Or, alternatively, it can be directed to a final anion exchange column for a final polishing operation wherein any residual acidic amino acids are removed. If the spent broth is to be discharged into the environment it is conveyed through conduit 34. If the spent broth is to be conveyed to storage tank it is conveyed through conduit 35, in which valve 36 is positioned, into storage tank 37. From storage tank 37 the spent broth is conveyed through conduit 38 to a number of reuses which may include the backwashing of the filtering means and the anion and cation exchange columns.

The backwashing of the filtering means 21 is accomplished by introducing the backwash media through conduit 23 and the backwash effluent is removed therefrom through conduit 24. Generally, the backwashing of the filter means 21 can be accomplished by simply utilizing a portion of the treated spent broth accumulated in the storage tank 37.

The backwashing of the anion exchange column 25 is accomplished by introducing a backwashing media through conduit 27 and conveying the effluent away from the anion exchange column through conduit 28. Such regeneration can be accomplished by adding a sufficient amount of an alkalizing agent such as sodium hydroxide to a fraction of the previously treated spent broth from storage tank 37 to provide a backwashing solution of about 4 percent sodium hydroxide. Other alkalizing agents without an oxygen demand but known to the art can be used in place of the caustic soda.

The backwashing of the cation exchange column 29 can be accomplished by introducing an acidic regeneration solution through conduit 31 and removing the effluent from the backwashing operation through conduit 32. The backwashing operation can be carried out by acidifying a fraction of the spent broth from the storage tank 37 with sulfuric acid on any one of a number of acidifying agents without an oxygen demand but known to the art to a concentration of about 4 percent.

Inasmuch as the backwashing of the filtering means 21 and the anion and cation exchange columns 25 and 29 respectively requires only a small fraction of treated spent broth which is rendered substantially fat and protein free through the useful process of this invention, the bulk of the treated spent broth can be released to the environment without any further treatment and meet the requirement of the Environmental Protection Agency of a biological oxygen demand of no more than 0.04 g. oxygen per liter of treated water released into the environment.

The instant useful process for treating spent fermentation broth containing high concentrations of fatty and proteinaceous residues is more clearly illustrated in Example 1 which follows:

EXAMPLE 1

Ten liters of monensic acid fermentation broth were filtered to remove the suspended mycelia and placed in a suitable vessel equipped with a means for agitation. The filtrate, amounting to about 9.45 liters, contained about 4.0 percent fats and residues thereof and about 1.5 percent proteinaceous material. About 5.0 ml. of 5.0 percent sulfuric acid were added to the filtered spent fermentation broth and the mixture thoroughly agitated resulting in a pH of about 3.0.

The acidified spent broth thus prepared was pumped through a laboratory-size coalescing strainer and about 370 ml. of coalesced fat was removed therefrom. About 9.0 liters of substantially fat-free acidified spent broth from the coalescing strainer were placed in a suitable vessel for basification, and about 5.0 ml. of 10.0 percent sodium hydroxide were added thereto with vigorous agitation and the pH was recorded at about 9.5.

About 9.0 liters of the basified spent broth were filtered through a bed of ground limestone and clean, fine sand. The bed of filter agent was contained in a glass cylinder and was about 200 mm deep and had a cross-sectional area of about $78.0 \times 10^2 mm^2$.

The filtrate from this filtering operation was passed through a bed of IRA 900 anion exchange resin for the removal of the last vestiges of the fats which were not taken out by the coalescing strainer and the filtering operation. The anion exchange resin was contained in a glass cylinder and had a cross-sectional area of about 500 $mm^2$ and was about 600 mm thick. The effluent from the anionic exchange column in an amount of about 8.6 liters was passed through a bed of cation exchange resin. Such resin was contained in a glass cylinder and had a cross-sectional area of about 500 $mm^2$ and was about 660 mm thick. The effluent from the cationic exchange column measured 8.20 liters and on testing for biological oxygen, demand was found to have a residual fat and proteinaceous material concentration that required about 0.040 g. oxygen per liter.

This waste spent broth effluent from the cationic exchange column was of a quality that permitted its direct discharge to the environment inasmuch as the biological oxygen demand was below the maximum of 0.04 g. oxygen per liter.

What is claimed is:

1. A process for treating spent monensic acid antibiotic fermetation broth containing concentrations of from about 0.3 to about 12 percent fat and residues thereof and from about 1.5 to about 9.5 percent protein and residues thereof comprising:
    a. acidifying the spent antibiotic fermentation broth to a pH of from about 3.0 to about 5.0;
    b. passing the acidified broth from step a) through a coalescing strainer wherein coalesced fat particles resulting from said acidification are impinged on a plate or screen disposed in such strainer, and removed from said broth;
    c. basifying the broth discharged from the coalescing strainer of step b) to a pH of from about 8.0 to about 9.0;
    d. passing the basified broth of step c) through a filtering means to remove coalesced protein materials formed in step c);
    e. passing the filtrate from the filtering means of step d) through an anion exchange column to remove the residual fatty materials from such filtrate; and
    f. passing the effluent from the anion exchange column of step e) through a cation exchange column to remove the residual proteinaceous material from such effluent.

2. The process of claim 1 wherein the acidification of the spent broth is accomplished by adding thereto a mineral acid selected from the class consisting of hydrochloric acid, nitric acid, phosphoric acid, and sulfuric acid.

3. The process of claim 2 wherein the acidification of the spent broth is accomplished by adding thereto a quantity of sulfuric acid sufficient to lower the pH to the specified range.

4. The process of claim 1 wherein the basification of the spent broth is accomplished by adding thereto a hydroxide of a cation selected from the class consisting of sodium, lithium, potassium and ammonium.

5. The process of claim 4 wherein the basification of the spent broth is accomplished by adding thereto a sufficient quantity of sodium hydroxide to achieve the desired pH range.

6. The process of claim 1 wherein the effluent from the filtration operation is passed through an anionic exchange column wherein the anion exchange resin is strongly basic with a quaternary functionality.

7. The process of claim 1 wherein the filtered spent broth effluent from the anionic exchange column is passed through a cationic exchange column wherein the cation exchange resin has either a carboxylic or sulfonate functionality.

* * * * *

UNITED STATES PATENT AND TRADEMARK OFFICE
CERTIFICATE OF CORRECTION

PATENT NO. : 4,007,115
DATED : February 8, 1977
INVENTOR(S) : Robert H. L. Howe

It is certified that error appears in the above-identified patent and that said Letters Patent are hereby corrected as shown below:

Column 8, line 44, "hydroxide is suitable" should read --hydroxide is not suitable--.

Signed and Sealed this

Twelfth Day of June 1979

[SEAL]

Attest:

RUTH C. MASON
Attesting Officer

DONALD W. BANNER
Commissioner of Patents and Trademarks